United States Patent
Ottaviani et al.

(10) Patent No.: US 7,430,788 B2
(45) Date of Patent: *Oct. 7, 2008

(54) MAGNETORHEOLOGICAL NANOCOMPOSITE ELASTOMER FOR RELEASABLE ATTACHMENT APPLICATIONS

(75) Inventors: Robert A. Ottaviani, Anthem, AZ (US); John C. Ulicny, Oxford, MI (US); Mark A. Golden, Washington, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/393,318

(22) Filed: Mar. 30, 2006

(65) Prior Publication Data

US 2006/0168780 A1 Aug. 3, 2006

Related U.S. Application Data

(60) Division of application No. 10/826,200, filed on Apr. 15, 2004, now Pat. No. 7,020,938, which is a division of application No. 10/304,089, filed on Nov. 25, 2002, now Pat. No. 6,877,193, which is a continuation-in-part of application No. 10/273,691, filed on Oct. 19, 2002, now Pat. No. 7,200,902.

(51) Int. Cl.
*A44B 21/00* (2006.01)

(52) U.S. Cl. ............... 24/442; 267/140.14; 267/140.15; 428/100; 188/267

(58) Field of Classification Search ............... 24/442, 24/446, 450, 451, 452, 448, 304
See application file for complete search history.

(56) References Cited

U.S. PATENT DOCUMENTS

| | | | |
|---|---|---|---|
| 2,717,437 A | 9/1955 | DeMestral | 428/92 |
| 2,994,117 A | 8/1961 | McMullin | 24/201 |
| 3,101,517 A | 8/1963 | Fox et al. | 24/442 |
| 3,128,514 A | 4/1964 | Parker et al. | 24/11 HC |
| 3,138,749 A | 6/1964 | Slibitz | 318/135 |
| 3,176,364 A | 4/1965 | Dritz | 24/306 |
| 3,292,019 A | 12/1966 | Hsu et al. | 310/328 |
| 3,365,757 A | 1/1968 | Billarant | 24/442 |
| 3,469,289 A | 9/1969 | Whitacre | 24/450 |

(Continued)

FOREIGN PATENT DOCUMENTS

DE 199 56 011 6/2001

(Continued)

*Primary Examiner*—Jack W. Lavinder

(57) ABSTRACT

A releasable fastener system comprises a loop portion and a hook portion. The loop portion includes a support and a loop material disposed on one side thereof whereas the hook portion includes a support and a plurality of closely spaced upstanding hook elements extending from one side thereof. When the hook portion and loop portion are pressed together they interlock to form a releasable engagement. The resulting joint created by the engagement is relatively resistant to shear and pull forces and weak in peel strength forces. The hook elements are formed of a magnetorheological elastomer that provides a change in shape orientation and/or flexural modulus of the hook elements. In this manner, the shape orientation and/or flexural modulus of the hook elements can be remotely changed to provide a reduction or magnification in the shear and/or pull-off forces in addition to providing variable damping capabilities to the fastener system.

7 Claims, 3 Drawing Sheets

U.S. PATENT DOCUMENTS

| | | | |
|---|---|---|---|
| 3,490,107 A | 1/1970 | Brumlik | 24/451 |
| 3,808,648 A | 5/1974 | Billarant et al. | 24/450 |
| 4,169,303 A | 10/1979 | Lemelson | 24/452 |
| 4,382,243 A | 5/1983 | Babitzka et al. | 335/219 |
| 4,391,147 A | 7/1983 | Krempl et al. | 73/730 |
| 4,634,636 A | 1/1987 | Yoshino et al. | 428/500 |
| 4,637,944 A | 1/1987 | Walker | 428/35 |
| 4,642,254 A | 2/1987 | Walker | 428/36 |
| 4,693,921 A | 9/1987 | Billarant et al. | 428/100 |
| 4,752,537 A | 6/1988 | Das | 428/614 |
| 4,775,310 A | 10/1988 | Fischer | 425/308 |
| 4,794,028 A | 12/1988 | Fischer | 428/100 |
| 4,931,344 A | 6/1990 | Ogawa et al. | 428/100 |
| 5,037,178 A | 8/1991 | Stoy et al. | 385/53 |
| 5,071,363 A | 12/1991 | Reylek et al. | 439/291 |
| 5,133,112 A | 7/1992 | Gomez-Acevedo | 24/450 |
| 5,136,201 A | 8/1992 | Culp | 310/328 |
| 5,182,484 A | 1/1993 | Culp | 310/328 |
| 5,191,166 A | 3/1993 | Smirlock et al. | 89/36.02 |
| 5,212,855 A | 5/1993 | McGanty | 24/452 |
| 5,284,330 A | 2/1994 | Carlson et al. | 267/140.14 |
| 5,312,456 A | 5/1994 | Reed et al. | 24/442 |
| 5,319,257 A | 6/1994 | McIntyre | 310/328 |
| 5,328,337 A | 7/1994 | Kunta | 417/310 |
| 5,429,875 A | 7/1995 | Okamoto et al. | 428/547 |
| 5,474,227 A | 12/1995 | Krengel et al. | 228/147 |
| 5,486,676 A | 1/1996 | Aleshin | 219/121.63 |
| 5,492,534 A | 2/1996 | Athayde et al. | 604/141 |
| 5,497,861 A | 3/1996 | Brotz | 188/267 |
| 5,547,049 A | 8/1996 | Weiss et al. | 188/267 |
| 5,611,122 A | 3/1997 | Torigoe et al. | 24/442 |
| 5,656,351 A | 8/1997 | Donaruma | 428/100 |
| 5,657,516 A | 8/1997 | Berg et al. | 24/452 |
| 5,669,120 A | 9/1997 | Wessels et al. | 24/446 |
| 5,671,498 A | 9/1997 | Martin et al. | 15/244.3 |
| 5,712,524 A | 1/1998 | Suga | 310/328 |
| 5,725,928 A | 3/1998 | Kenney et al. | 428/100 |
| 5,797,170 A | 8/1998 | Akeno | 24/452 |
| 5,798,188 A | 8/1998 | Mukohyama et al. | 429/34 |
| 5,814,999 A | 9/1998 | Elie et al. | 324/662 |
| 5,816,587 A | 10/1998 | Stewart et al. | 280/5.516 |
| 5,817,380 A | 10/1998 | Tanaka | 428/100 |
| 5,885,652 A | 3/1999 | Abbott et al. | 427/163.2 |
| 5,945,193 A | 8/1999 | Pollard et al. | 428/100 |
| 5,969,518 A | 10/1999 | Merklein et al. | 324/173 |
| 5,974,856 A | 11/1999 | Elie et al. | 73/11.04 |
| 5,979,744 A | 11/1999 | Brigleb | 229/87.01 |
| 5,983,467 A | 11/1999 | Duffy | 24/442 |
| 6,029,783 A | 2/2000 | Wirthlin | 188/267.1 |
| 6,086,599 A | 7/2000 | Lee et al. | 606/108 |
| 6,102,912 A | 8/2000 | Cazin et al. | 606/61 |
| 6,102,933 A | 8/2000 | Lee et al. | 606/209 |
| 6,129,970 A | 10/2000 | Kenney et al. | 428/100 |
| 6,148,487 A | 11/2000 | Billarant | 24/442 |
| 6,156,842 A | 12/2000 | Hoenig et al. | 525/171 |
| 6,203,717 B1 | 3/2001 | Munoz et al. | 252/62.52 |
| 6,257,133 B1 | 7/2001 | Anderson | 100/162 B |
| 6,388,043 B1 | 5/2002 | Langer et al. | 528/80 |
| 6,454,923 B1 | 9/2002 | Dodgson et al. | 204/415 |
| 6,460,230 B2 | 10/2002 | Shimamura et al. | 24/452 |
| 6,502,290 B1 | 1/2003 | Tseng | 28/161 |
| 6,544,245 B2 | 4/2003 | Neeb et al. | 24/442 |
| 6,546,602 B1 | 4/2003 | Eipper et al. | 24/442 |
| 6,593,540 B1 | 7/2003 | Baker et al. | 219/121.63 |
| 6,598,274 B1 | 7/2003 | Marmaropoulos | 24/451 |
| 6,605,795 B1 | 8/2003 | Arcella et al. | 219/121.63 |
| 6,628,542 B2 | 9/2003 | Hayashi et al. | 365/158 |
| 6,681,849 B2 | 1/2004 | Goodson | 166/66.5 |
| 6,740,094 B2 | 5/2004 | Maitland et al. | 606/108 |
| 6,742,227 B2 | 6/2004 | Ulicny et al. | 24/442 |
| 6,766,566 B2 | 7/2004 | Cheng et al. | 24/452 |
| 6,797,914 B2 | 9/2004 | Speranza et al. | 219/121.64 |
| 6,815,873 B2 | 11/2004 | Johnson et al. | 310/331 |
| 2002/0007884 A1 | 1/2002 | Schuster et al. | 148/654 |
| 2002/0050045 A1 | 5/2002 | Chiodo | 29/426.5 |
| 2002/0062547 A1 | 5/2002 | Chiodo et al. | 29/426.5 |
| 2002/0076520 A1 | 6/2002 | Neeb et al. | 428/100 |
| 2002/0142119 A1 | 10/2002 | Seward et al. | 428/36.9 |
| 2003/0120300 A1 | 6/2003 | Porter | 606/191 |
| 2004/0025639 A1 | 2/2004 | Shahinpoor et al. | 75/722 |
| 2004/0033336 A1 | 2/2004 | Schulte | 428/100 |
| 2004/0074061 A1 | 4/2004 | Ottaviani et al. | 24/442 |
| 2004/0074062 A1 | 4/2004 | Stanford et al. | 24/442 |
| 2004/0074063 A1 | 4/2004 | Golden et al. | 24/442 |
| 2004/0074064 A1 | 4/2004 | Powell et al. | 24/442 |
| 2004/0074067 A1 | 4/2004 | Browne et al. | 24/442 |
| 2004/0074068 A1 | 4/2004 | Browne et al. | 24/442 |
| 2004/0074069 A1 | 4/2004 | Browne et al. | 24/442 |
| 2004/0074070 A1 | 4/2004 | Momoda et al. | 24/442 |
| 2004/0074071 A1 | 4/2004 | Golden et al. | 24/442 |
| 2004/0117955 A1 | 6/2004 | Barvosa-Carter et al. | 24/442 |

FOREIGN PATENT DOCUMENTS

| | | |
|---|---|---|
| EP | 0385443 | 9/1990 |
| EP | 0673709 | 9/1995 |
| JP | 401162587 | 6/1989 |
| JP | 4-314446 | 4/1992 |
| JP | 4-266970 | 9/1992 |
| JP | 08260748 | 10/1996 |
| WO | WO 99/42528 | 8/1999 |
| WO | WO 00/62637 | 10/2000 |
| WO | WO 01/84002 | 11/2001 |
| WO | WO 02/45536 | 6/2002 |

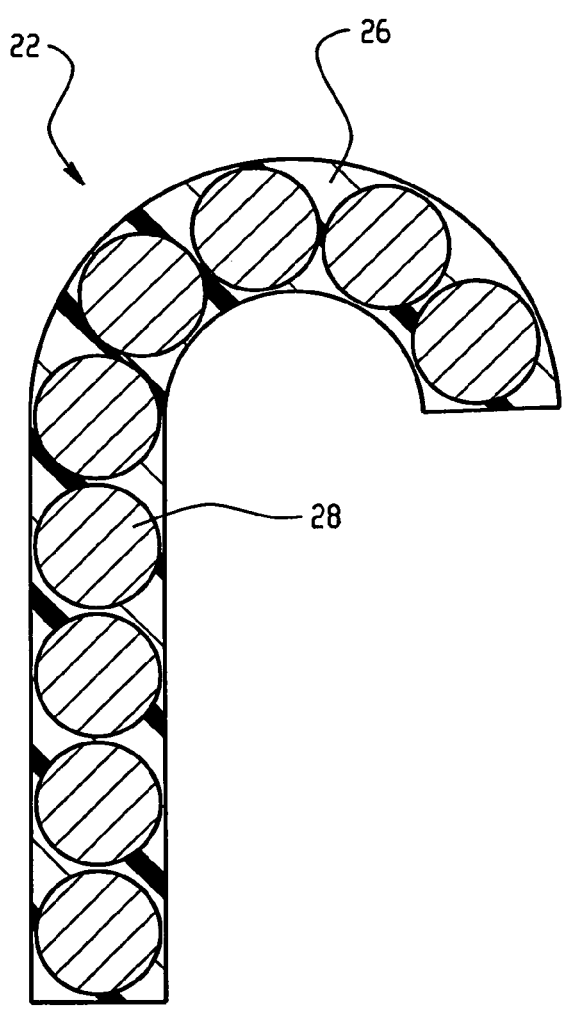
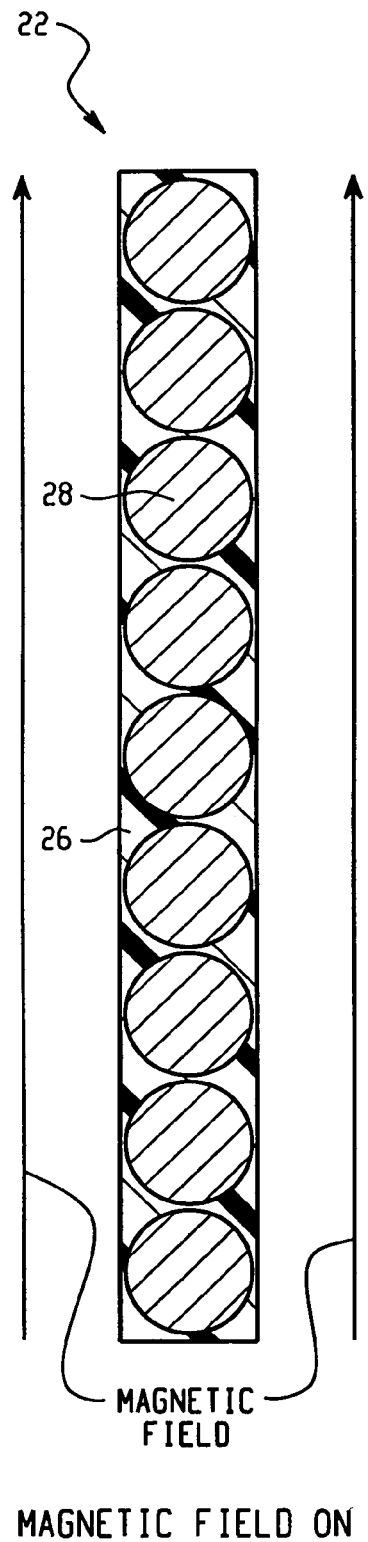
MAGNETIC FIELD OFF
MAGNETIC FIELD ON
*Fig. 4A*
*Fig. 4B*

MAGNETORHEOLOGICAL NANOCOMPOSITE ELASTOMER FOR RELEASABLE ATTACHMENT APPLICATIONS

CROSS-REFERENCE TO RELATED APPLICATIONS

This application is a Divisional of U.S. application Ser. No. 10/826,200 filed Apr. 15, 2004 now U.S. Pat. No. 7,020,938, which is a Divisional of U.S. application Ser. No. 10/304,089 filed Nov. 25, 2002 now U.S. Pat. No. 6,877,193, which claims priority to and is a Continuation-in-Part of U.S. application Ser. No. 10/273,691, filed Oct. 19, 2002 now U.S. Pat. No. 7,200,902, which are incorporated by reference herein.

BACKGROUND

This disclosure relates to releasable attachment devices of the type used to fasten, retain, or latch together components of an apparatus or a structure that are to be separated or released under controlled conditions. This disclosure further relates to releasable attachment devices that provide variable damping capabilities.

Hook and loop type separable fasteners are well known and are used to join two members detachably to each other. These types of fasteners generally have two components disposed on opposing member surfaces. One component typically includes a plurality of resilient hooks while the other component typically includes a plurality of loops. When the two components are pressed together they interlock to form a releasable engagement. The resulting joint created by the engagement is relatively resistant to shear and pull forces, and weak in peel strength forces. As such, peeling one component from the other component can be used to separate the components with a minimal applied force. As used herein, the term "shear" refers to an action or stress resulting from applied forces that causes or tends to cause two contiguous parts of a body to slide relatively to each other in a direction parallel to their plane of contact. The term "pull force" refers to an action or stress resulting from applied forces that causes or tends to cause two contiguous parts of a body to move relative to each other in a direction perpendicular to their plane of contact.

Magnetorheological (MR) elastomers are known as "smart" materials whose Theological properties are rapidly changed upon application of a magnetic field. MR elastomers are suspensions of micrometer- or nanometer-sized, magnetically polarizable particulates embedded in an elastomeric polymer or rubber. The stiffness of the MR elastomer structure is accomplished by changing the shear and compression/tension moduli by varying the strength of the applied magnetic field. The stronger the magnetic field, the stiffer the MR elastomer will be. The MR elastomer typically develops structure when exposed to a magnetic field in as little as a few milliseconds. Discontinuing the exposure of the MR elastomer to the magnetic field reverses the process and the MR elastomer returns to its lower modulus state. Because of the ability to vary the modulus or stiffness of the MR elastomer on demand, MR elastomers have found use as components in damping devices.

BRIEF SUMMARY

Disclosed herein is a releasable fastener system that provides for a controlled release or separation of a joint in a shear and/or pull-off direction, while providing active or variable damping properties when the fastener is engaged. A releasable fastener system comprises a loop portion comprising a support and a loop material disposed on a surface thereon; a hook portion comprising a support and a plurality of hook elements disposed on a surface, wherein the plurality of hook elements comprises a magnetorheological elastomer adapted to change a shape orientation and/or flexural modulus of the hook elements upon receipt of a magnetic signal; and an activation device coupled to the plurality of hook elements, the activation device being operable to selectively provide the magnetic signal to the hook elements and effectuate a change in the shape orientation and/or flexural modulus of the hook elements to reduce or increase a shear force and/or a pull-off force, and wherein the change in the flexural modulus of the hook elements provides a damping capability to the fastener system.

A process for operating a releasable fastener system comprises contacting a loop portion to a hook portion to form a releasable engagement, wherein the loop portion comprises a support and a loop material disposed on a surface thereon, and wherein the hook portion comprises a support and a plurality of hook elements disposed on a surface, wherein the plurality of hook elements comprises a magnetorheological elastomer adapted to change a shape orientation and/or flexural modulus upon receipt of an magnetic signal, wherein the change in the flexural modulus of the hook elements provides a damping capability to the fastener system; maintaining constant shear and pull-off forces in the releasable engagement; selectively introducing the magnetic signal to the hook elements, wherein the magnetic signal is effective to change a shape orientation and/or flexural modulus; and reducing or increasing shear and/or pull-off forces in the releasable engagement.

A hook portion for a releasable fastener system comprises a support and a plurality of hook elements disposed on a surface of the support, wherein the plurality of hook elements comprise a magnetorheological elastomer adapted to change a shape orientation and/or a flexural modulus upon receipt of a magnetic signal, wherein the change in the flexural modulus of the hook elements provides a damping capability.

An engine mount comprising the releasable fastener is also disclosed.

The above described and other features are exemplified by the following figures and detailed description.

BRIEF DESCRIPTION OF THE DRAWINGS

Referring now to the figures, which are exemplary embodiments and wherein the like elements are numbered alike:

FIG. 4 is a cross sectional view of an exemplary MR elastomer hook.

DETAILED DESCRIPTION

Figure 1:
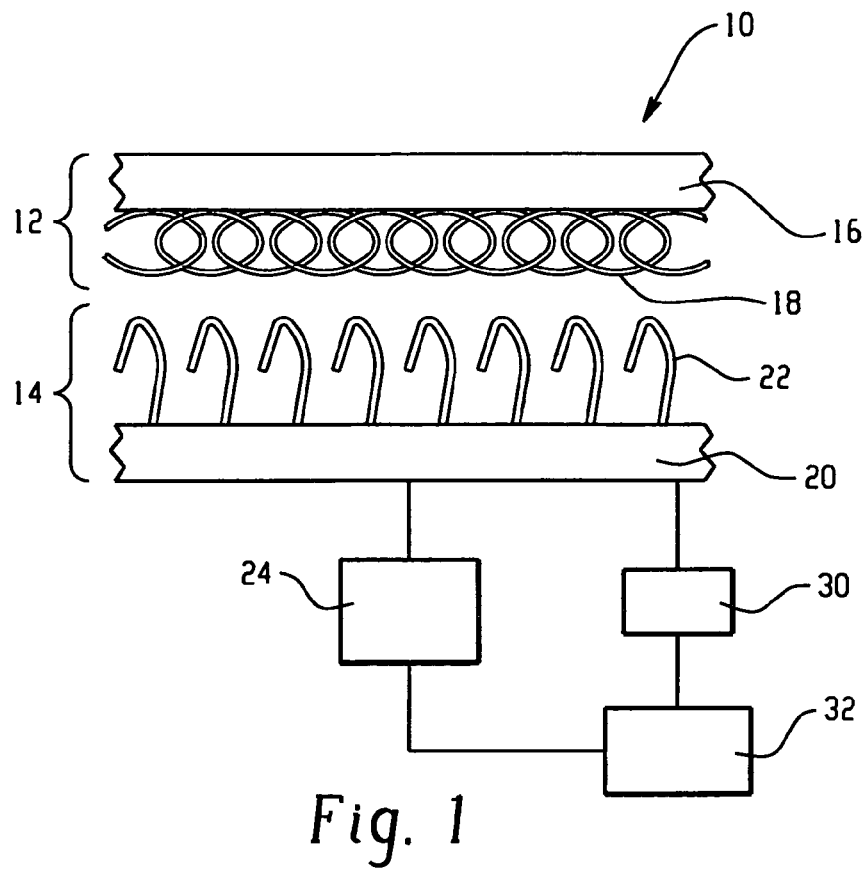
FIG. 1 is a cross sectional view of a releasable fastening system.

As shown in FIG. 1, a releasable fastener system, generally indicated as 10, comprises a loop portion 12 and a hook portion 14. The loop portion 12 includes a support 16 and a loop material 18 disposed on one side thereof whereas the hook portion 14 includes a support 20 and a plurality of closely spaced upstanding hook elements 22 extending from one side thereof. The hook elements 22 are formed of a magnetorheological elastomer that provides a shape changing and/or flexural modulus capability to the hook elements 22 as will be described in greater detail.

Coupled to and in operative communication with the hook elements 22 is an activation device 24. The activation device 24, on demand, provides a magnetic activation signal to the hook elements 22 to change the shape orientation and/or flexural modulus property of the hook elements 22. The change in shape orientation and/or flexural modulus property generally remains for the duration of the applied activation signal. Upon discontinuation of the magnetic activation signal, the hook elements 22 revert substantially to a relaxed or unpowered shape. The illustrated releasable fastener system 10 is exemplary only and is not intended to be limited to any particular shape, size, configuration, number or shape of hook elements 22, shape of loop material 18, or the like.

During engagement, the two portions 12 and 14 are pressed together to create a joint that is relatively strong in shear and pull-off directions, and weak in a peel direction. For example, when the two portions 12 and 14 are pressed into face-to-face engagement, the hook elements 22 become engaged with the loop material 18 and the close spacing of the hook elements 22 resists substantial lateral movement when subjected to shearing forces in the plane of engagement. Similarly, when the engaged joint is subjected to a force perpendicular to this plane, (i.e., pull-off forces), the hook elements 22 resist substantial separation of the two portions 12 and 14. However, when the hook elements 22 are subjected to a peeling force, the hook elements 22 can become disengaged from the loop material 18. It should be noted that separating the two portions 12 and 14 using the peeling force generally requires that one or both of the supports forming the hook portion and loop portion be flexible.

Figure 2:
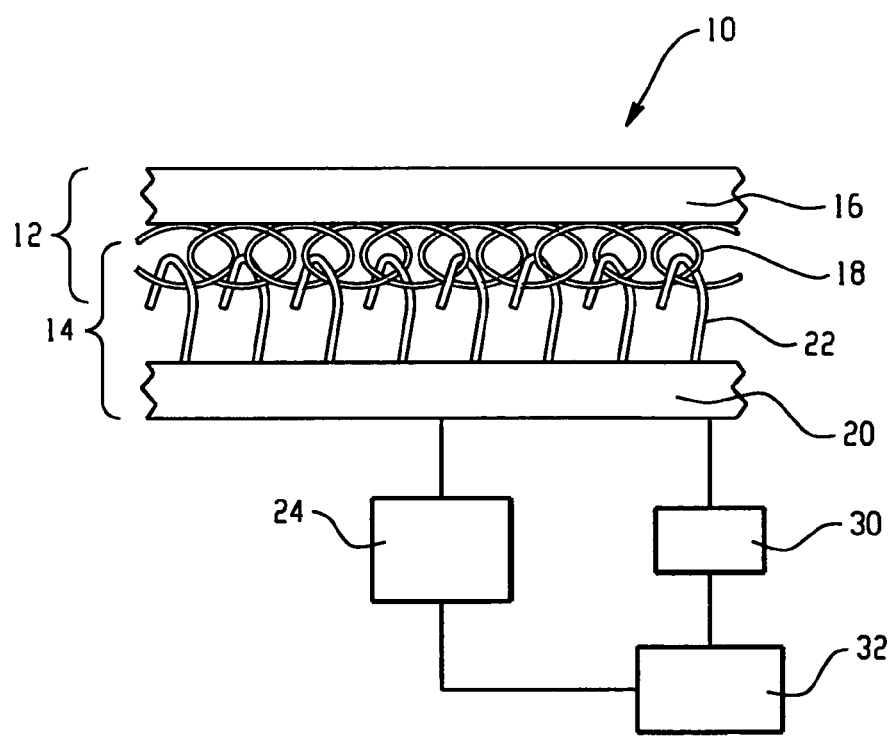
FIG. 2 is a cross sectional view of the releasable fastening system of FIG. 2, wherein the releasable fastening system is engaged.
Figure 3:
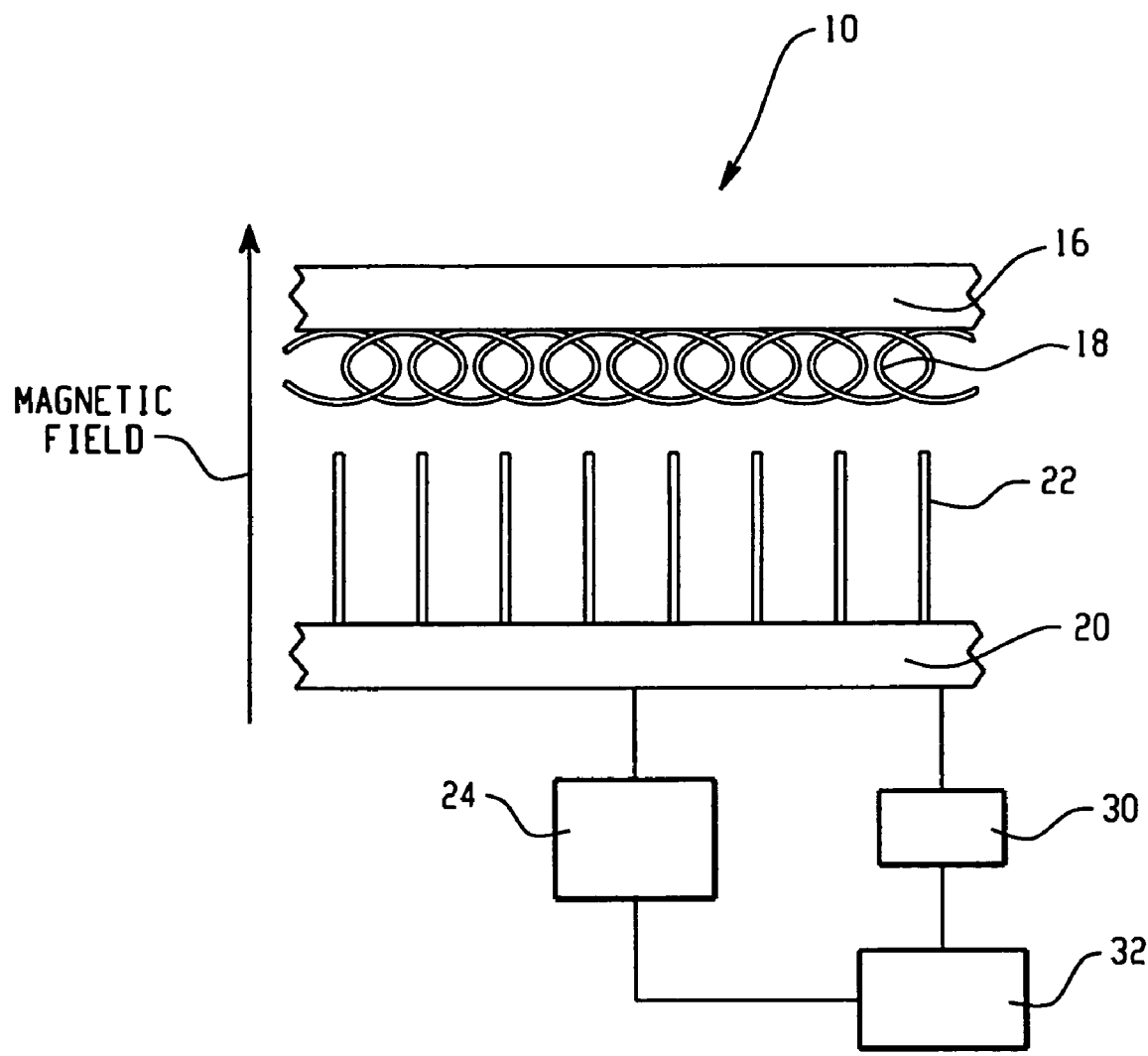
FIG. 3 is a cross sectional view of the releasable fastening system of FIG. 2, wherein the releasable fastening system is disengaged.

To reduce shear and pull-off forces resulting from the engagement, the shape orientation and/or flexural modulus of the hook elements 22 is altered upon receipt of the activation signal from the activation device 24 to provide a remote releasing mechanism of the engaged joint. As a result of changing the shape orientation and/or flexural modulus of the hook elements 22, a marked reduction in shear and pull-off forces is observed, thereby allowing the joint to separate in directions normally associated with pull-off and shear. That is, the change in shape orientation reduces the shearing forces in the plane of engagement, and reduces the pull-off forces perpendicular to the plane of engagement. For example, as shown in FIGS. 2 and 3, the plurality of hook elements 22 can have inverted J-shaped orientations that are changed, upon demand, to substantially straightened shape orientations upon receiving an activation signal from the activation device 24. The substantially straightened shape relative to the J-shaped orientation provides the joint with marked reductions in shear and pull-off forces.

In the alternative, to increase shear and pull-off forces resulting from the engagement, the shape orientation of the hook elements 22 is altered upon receipt of the activation signal from the activation device 24 to provide a remote mechanism of enhancing the engaged joint. As a result of changing the shape orientation and/or flexural modulus of the hook elements 22, a marked enhancement in shear and pull-off forces is observed, thereby increasing the force required to separate the joint in directions associated with pull-off and shear. That is, the change in shape orientation increases the shearing forces in the plane of engagement, and increases the pull-off forces perpendicular to the plane of engagement. For example, the plurality of hook elements can have inverted J-shaped orientations that are changed, upon demand, to hook elements having an increased flexural modulus (stiffness) upon receiving an activation signal from the activation device. The increased stiffness of the J-shaped hook relative to stiffness in the unpowered state provides the joint with marked increases in shear and pull-off forces. It will be understood that the magnetic field must be in an appropriate direction and of a sufficient strength to effectuate either a reduction in shear and pull-off forces or an increase in shear and pull-off forces.

In addition to providing a reduction or increase in shear and/or pull-off forces, the MR elastomer hook elements provide active damping capabilities to the fastener system. As shown in FIG. 1, a sensor device 30 is preferably attached to the hook support 20 and measures the vibrations occurring in the fastener system. Optionally, the sensor 30 may be attached to the loop support 16. The sensor 30 is in operative communication with a computer 32, which is in operative communication with the activation device 24. The computer 32 receives an input signal from the sensor 30, and then calculates the amount of damping required. The computer 32 then sends and output signal to the activation device 24, which provides a magnetic signal of the required strength, direction, and duration to the hook elements 22. The hook elements 22 in turn have an increase in flexural modulus in proportion to the strength of the magnetic signal. A continuously variable control of the flexural modulus of the hook elements allows for effective damping of the fastener system. An alternative fastener system can have the loop material 18 as well as the hook elements 22 fabricated from a MR elastomer to further increase the damping capabilities of the fastener system 10.

Referring now to FIG. 4, an exemplary magnetorheological hook 22 comprises an elastomeric material 26 and magnetic particulates 28 disposed within the elastomeric material 26. Preferably, the elastomeric material 26 employed is resilient and flexible.

The hook elements 22 may be formed integrally with support 20, or more preferably, may be attached to the support 20. In practice, spacing between adjacent hook elements 22 is an amount effective to provide sufficient damping properties and shear and pull-off resistance desired for the particular application during engagement with the loop material 18. Depending on the desired application, the damping or the amount of shear and pull-off force required for effective engagement can vary significantly. Generally, the closer the spacing and the greater the number of hook elements 22 employed will result in increased shear and pull-off forces upon engagement. The hook elements 22 preferably have a shape configured to become engaged with the loop material 18 upon pressing contact of the loop portion 12 with the hook portion 14, and vice versa. In this engaged mode, the hook elements 22 can have an inverted J-shaped orientation, an inverted L-shape, a mushroom shape, a knob shape, a multi-tined anchor, T-shape, spirals, or any other mechanical form of a hook-like element used for separable hook and loop fasteners. Such elements are referred to herein as "hook-like", "hook-type", or "hook" elements whether or not they are in the shape of a hook. Likewise, the loop material may comprise a plurality of loops or pile, a shape complementary to the hook element (e.g., a key and lock type engagement), or any other mechanical form of a loop-like element used for separable hook and loop fasteners.

Suitable MR elastomer materials include, but are not intended to be limited to, ferromagnetic or paramagnetic particulates suspended in an elastomeric polymer matrix. Suitable polymer matrices include, but are not limited to, poly-alpha-olefins, natural rubber, silicone, polybutadiene, polyethylene, polyisoprene, polyurethane, and the like.

Suitable ferromagnetic or paramagnetic particulates include compounds comprising oxides, chlorides, sulfates, sulfides, hydrates, and other organic or inorganic compounds of cerium, chromium, cobalt, dysprosium, erbium, europium, gadolinium, holmium, iron, manganese, neodymium, nickel, praesodymium, samarium, terbium, titanium, uranium, vanadium, and yttrium. Preferred particulates include alloys of iron, nickel, manganese, and cobalt, with or without other nonmagnetic elements; alloys of iron, nickel, manganese, and cobalt with gadolinium; and the like. Other preferred particulates include magnetite ($Fe_3O_4$) and other compounds of iron and oxygen, and a third metallic component.

The preferred particulates are nanoparticles. Suitable diameter sizes for the particulates can be less than or equal to about 500 nanometers, with less than or equal to about 250 nanometers preferred, and less than or equal to about 100 nanometers more preferred. Also preferred is a particulate diameter of greater than or equal to about 1.0 nanometer, with greater than or equal to about 10 nanometers more preferred, and greater than or equal to about 50 nanometers especially preferred. The particulates preferably have an aspect ratio of about 0.25 to about 4, where the aspect ratio is defined as the ratio of the length to the equivalent circular diameter. The particulates are preferably present in an amount between about 5 to about 50 percent by volume of the total MR elastomer composition. Alternatively, the particles can be larger, e.g., micron sized particles, to be effective in altering the modulus properties of the material in a magnetic field. However, the nanometer-sized particles are more preferred because the modulus properties of the particle/elastomer composite can be more readily tailored by the choice of particle size, particle size distribution and particle concentration when the nanometer-sized particles are used.

The MR elastomer can be formed into hook elements using techniques well known in the art, such as extrusion into fibers or rods, injection molding, compression molding, and the like.

The activation device 24 can be configured to deliver an activation signal to the hook elements 22, wherein the activation signal comprises a magnetic signal. The magnetic signal is preferably in the form of a magnetic field. The magnetic field may be generated by a permanent magnet, an electromagnet, or combinations of the foregoing. The strength and direction of the magnetic field employed is primarily dependent on the particular MR elastomer employed for fabricating the hook element and the use to which the assembly will be put. The magnitude and duration of the applied field strength preferred is an amount suitable to change a shape orientation and/or flexural modulus of the hooks to reduce or increase a shear force and/or pull-off force, as well as to provide variable damping properties to the engaged fastener system. A non-limiting example for reduction in shear force and/or pull-off force is a change in a hook shape from an inverted J-shaped orientation to a substantially straightened orientation (As shown in FIGS. 2 and 3). The magnitude of the applied field strength for damping properties varies depending upon the strength of the vibration being damped. A non-limiting example for damping is to increase the flexural modulus of the hook shape to substantially damp the vibration force(s) in the fastener system.

Suitable magnetic field strengths for the hook elements (or in the appropriate circumstance the loop elements) comprised of MR elastomers range from greater than about 0 to about 1 Tesla (T).

The loop material 18 generally comprises a random looped pattern or pile of a material. The loop material is often referred to as the "soft", the "fuzzy", the "pile", the "female", or the "carpet". Suitable loop materials are commercially available under the trademark VELCRO from the Velcro Industries B.V. Materials suitable for manufacturing the loop material include metals, and thermoplastics such as polypropylene, polyethylene, polyamide, polyester, polystyrene, polyvinyl chloride, acetal, acrylic, polycarbonate, polyphenylene oxide, polyurethane, polysulfone, and the like. For added damping capabilities, the loop material may also comprise MR elastomers. The loop material 18 may be integrated with the support or may be attached to the support.

The supports 16 (loop portion 12) or 20 (hook portion 14) may be rigid or flexible depending on the intended application. Suitable materials for fabricating the support include plastics, fabrics, metals, and the like. For example, suitable plastics include thermoplastics such as for example polypropylene, polyethylene, polyamide, polyester, polystyrene, polyvinyl chloride, acetal, acrylic, polycarbonate, polyphenylene oxide, polyurethane, polysulfone, and other like thermoplastic polymers. An adhesive may be applied to the backside surface of the support (the surface free from the hook elements 22 or loop material) for application of the releasable fastener system to an apparatus or structure. Alternatively, the releasable fastener system 10 may be secured to an apparatus or structure by bolts, by welding, or any other mechanical securement means. It should be noted that, unlike traditional hook and loop fasteners, both supports 16 and 20 could be fabricated from a rigid or inflexible material in view of the remote releasing capability provided. Traditional hook and loop fasteners typically require at least one support to be flexible so that a peeling force can be applied for separation of the hook and loop fastener.

The support 20 may also comprise the activation device 24 for providing the activating signal to the hook elements. For example, the support 20 may be an electromagnet for providing a magnetic signal.

In one embodiment, the flexural modulus property of the hook elements 22, in the absence of a magnetic signal, is preferably unable to maintain a given load and cannot form an engaged fastener system. By applying a magnetic signal to the hook elements, the flexural modulus property of the hook elements 22 would be sufficient to maintain the fastener system in an engaged position, and therefore maintain the load. Upon removal of the magnetic signal, the releasable fastener system disengages due to the decrease in the flexural modulus property of the hook elements. Thus, in this embodiment, the degree of attachment force can be controlled by the applied magnetic field strength. In addition to the hold characteristics, the flexural modulus of the hook elements can variably changed to provide damping properties to the fastener system and still maintain engagement.

In another embodiment, the flexural modulus property of the hook elements 22, in the absence of a magnetic signal, is preferably able to maintain a given load when the fastener is engaged, as well as to provide variable damping capabilities. In the presence of a sufficiently high magnetic field, the flexural modulus property of the hook elements 22 increases resulting in hook elements 22 prone to brittle fracture when subjected to a high shear force. In this embodiment, controlling the fracture stiffness of the joint can control the breakaway shear force in the engaged fastener system joint. The fracture stiffness of the joint is in turn controlled by the applied magnetic field strength.

It will be appreciated that any number of different products or structural elements can be disassembled and damped using these techniques. In a particularly preferred application, the attachment is an engine mount between a vehicle frame and an engine, which is selectively releasable during a catastrophic event, such as a collision or impact. The release could occur, for example, either by reducing the shear and/or pull-off force, or increasing the flexural modulus of the hook elements to break away through brittle fracture of the hook elements. Prior to disassembly on demand, varying the flexural modulus of the hook elements provides active damping of vibrations.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. A hook portion for a releasable fastener system comprising:
   a support and
   a plurality of hook elements disposed on a surface of the support, wherein the plurality of hook elements comprise a magnetorheological elastomer adapted to change a shape orientation and/or a flexural modulus upon receipt of a magnetic signal, wherein the magnetorheological elastomer comprises ferromagnetic or paramagnetic particulates in an elastomeric material.

2. The hook portion according to claim 1, wherein the support comprises a metal, a plastic, a fabric, or a combination comprising at least one of the foregoing materials.

3. The hook portion according to claim 1, wherein the hook elements comprise a shape comprising a J-shaped orientation, an L-shape, a mushroom shape, a knob shape, a multitined anchor shape, a T-shape, a spiral shape, and combinations comprising at least one of the foregoing shapes.

4. The hook portion according to claim 1, wherein the elastomeric material comprises poly-alpha-olefins, natural rubber, silicone, polybutadiene, polyethylene, polyisoprene, polyurethane, or combinations comprising at least one of the foregoing polymeric materials.

5. The hook portion according to claim 1, wherein the particulates comprise iron alloys, nickel alloys, manganese alloys, cobalt alloys, or compounds comprising oxides, chlorides, sulfates, sulfides, or hydrates of cerium, chromium, cobalt, dysprosium, erbium, europium, gadolinium, holmium, iron, manganese, neodymium, nickel, praesodymium, samarium, terbium, titanium, uranium, vanadium, or yttrium.

6. The hook portion according to claim 1, wherein the particulates comprise nanometer sized particles.

7. The hook portion according to claim 1, wherein the shape orientation of the plurality of hook elements changes from an inverted J-shaped orientation to a substantially straightened orientation upon receipt of the activation signal.

* * * * *